US012628724B2

(12) United States Patent
Conrad et al.

(10) Patent No.: US 12,628,724 B2
(45) Date of Patent: May 19, 2026

(54) USER PRIORITIES FOR PERFORMING FARMING ACTIONS

(71) Applicant: Deere & Company, Moline, IL (US)

(72) Inventors: Swen Ulrich Conrad, Mountain View, CA (US); Anthony John Latham, Ankeny, IA (US); Kent Michael Anderson, Signal Mountain, TN (US)

(73) Assignee: Deere & Company, Moline, IL (US)

( * ) Notice: Subject to any disclaimer, the term of this patent is extended or adjusted under 35 U.S.C. 154(b) by 264 days.

(21) Appl. No.: 18/489,514

(22) Filed: Oct. 18, 2023

(65) Prior Publication Data

US 2025/0127073 A1 Apr. 24, 2025

(51) Int. Cl.
  *A01B 79/02* (2006.01)
  *A01B 79/00* (2006.01)
  *G05D 1/00* (2006.01)

(52) U.S. Cl.
  CPC ............ *A01B 79/02* (2013.01); *A01B 79/005* (2013.01); *G05D 1/0223* (2013.01)

(58) Field of Classification Search
  CPC ..... A01B 79/02; A01B 79/005; G05D 1/0223
  See application file for complete search history.

(56) References Cited

U.S. PATENT DOCUMENTS

| | | | |
|---|---|---|---|
| 2019/0250573 A1 * | 8/2019 | Sporrer | ................ A01B 79/005 |
| 2019/0354081 A1 * | 11/2019 | Blank | .................... G06Q 5/025 |
| 2019/0373806 A1 | 12/2019 | Wataya et al. | |

| | | | |
|---|---|---|---|
| 2020/0029490 A1 * | 1/2020 | Bertucci | .............. A01B 79/005 |
| 2022/0192084 A1 * | 6/2022 | Mizushima | .......... G06V 20/188 |
| 2022/0192174 A1 * | 6/2022 | Humpal | .............. A01M 7/0042 |
| 2025/0000010 A1 * | 1/2025 | Cline | .................. G06V 20/188 |

FOREIGN PATENT DOCUMENTS

| | | | | |
|---|---|---|---|---|
| AU | 2018203764 A1 | 1/2019 | | |
| CA | 3029916 A1 | 8/2019 | | |
| CA | 3112581 C | * 6/2022 | ....... G06Q 10/06315 |
| EP | 3570228 A1 | 11/2019 | | |

OTHER PUBLICATIONS

Extended European Search Report and Written Opinion issued in European Patent Application No. 24202509.6 dated Mar. 14, 2025, in 07 pages.

* cited by examiner

*Primary Examiner* — Frederick M Brushaber
(74) *Attorney, Agent, or Firm* — Fenwick & West LLP

(57) ABSTRACT

Some embodiments relate to a control system sending for display a first user interface requesting user priority values for treatment metrics. The control system receives, as input from a user interacting with the first user interface, user priority values. The control system operates the farming machine according to the user priority values. Based on sensor data generated as the farming machine operates in the field, the control system determines actual values of the treatment metrics. The control system sends for display on the client device a second user interface including the actual values for the treatment metrics. The control system receives updated user priority values from the client device for the treatment metrics. The updated user priority values are received as input from the user interacting with the second user interface. The control system updates operation of the farming machine according to the updated user priority values.

18 Claims, 8 Drawing Sheets

System Environment 200

Control System 210

Network 240

Client Device 243

External Systems 220

Sensors 222

Processing Unit 224

Datastores 226

Machine Component Array 230

Component 232

Input Controllers 234

Sensors 236

300

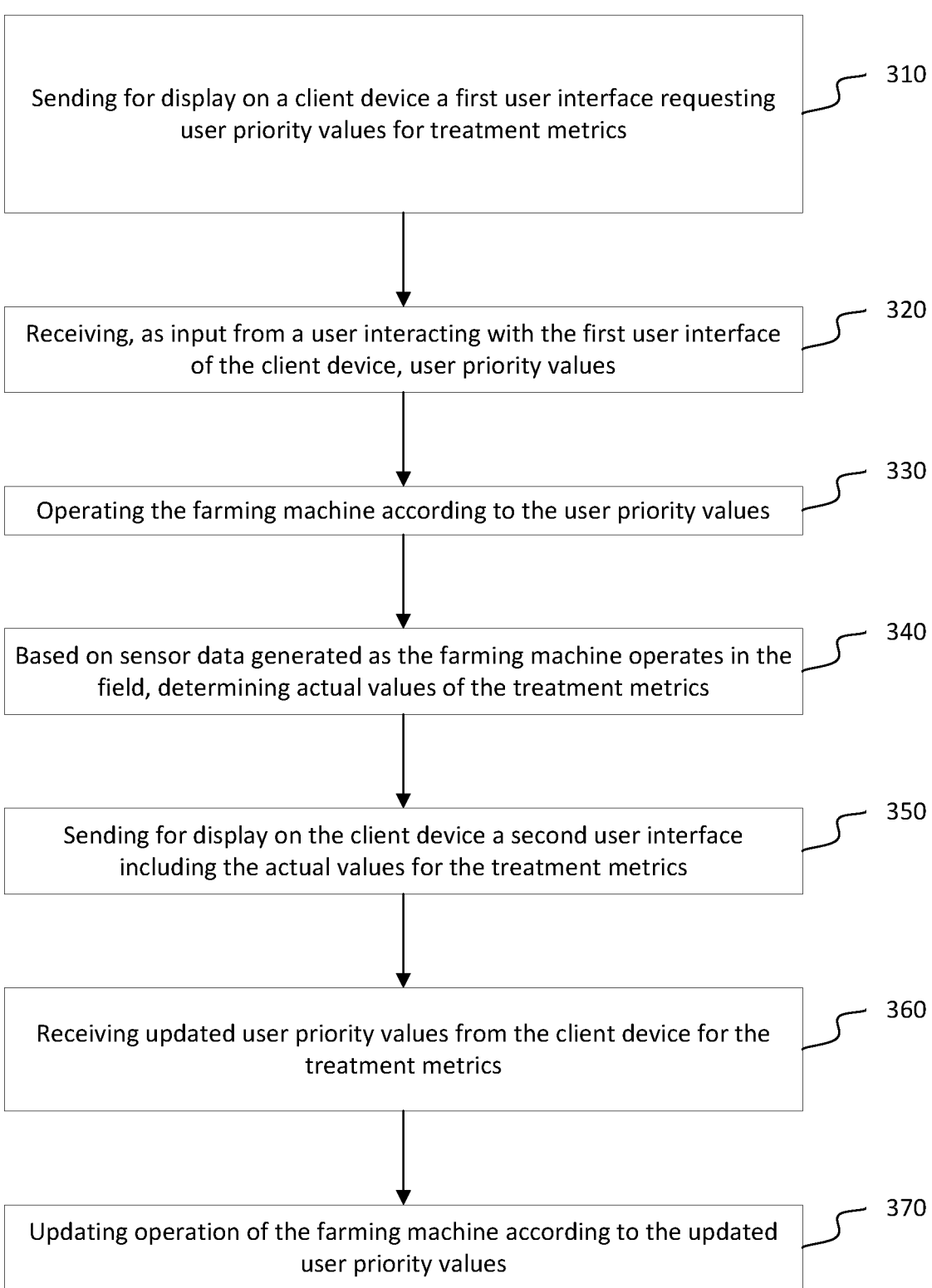

Sending for display on a client device a first user interface requesting user priority values for treatment metrics — 310

Receiving, as input from a user interacting with the first user interface of the client device, user priority values — 320

Operating the farming machine according to the user priority values — 330

Based on sensor data generated as the farming machine operates in the field, determining actual values of the treatment metrics — 340

Sending for display on the client device a second user interface including the actual values for the treatment metrics — 350

Receiving updated user priority values from the client device for the treatment metrics — 360

Updating operation of the farming machine according to the updated user priority values — 370

FIG. 3

Treatment Metrics
511

USER PRIORITIES FOR PERFORMING FARMING ACTIONS

BACKGROUND

Field of Disclosure

This disclosure relates to operating a farming machine, and more specifically, to operating a farming machine according to user priorities for one or more treatment metrics.

Description of Related Art

A user can have a variety of different priorities for operating a farming machine in a field depending on any number of factors. For example, a first user may desire to prioritize quality treatments to plants over treatment speed while another user may desire to prioritize treatment speed over treatment quality. However, the degree of correlation between any of the above metrics may not be easily determined or known by users.

SUMMARY

Some embodiments relate to a method for operating a farming machine configured to perform farming actions in a field. The method includes a control system sending for display on a client device a first user interface requesting user priority values for treatment metrics including treatment quality, treatment product savings, and farming machine productivity, the user priority values to be implemented while the farming machine performs farming actions in the field. The control system receives, as input from a user interacting with the first user interface of the client device, user priority values. The control system operates the farming machine according to the user priority values. Based on sensor data generated as the farming machine operates in the field, the control system determines actual values of the treatment metrics. The control system sends for display on the client device a second user interface including the actual values for the treatment metrics. The control system receives updated user priority values from the client device for the treatment metrics. The updated user priority values are received as input from the user interacting with the second user interface. The control system updates the operation of the farming machine according to the updated user priority values.

Some embodiments relate to a method for operating a farming machine configured to perform farming actions in a field, a client device receives a first user interface requesting user priority values for plant treatment metrics including treatment quality, treatment product savings, and farming machine productivity. The client device receives, as input from a user interacting with the first user interface, user priority values for the treatment metrics. The client device transmits the user priority values for the treatment metrics to the farming machine for the farming machine to implement while the farming machine performs farming actions in the field. The client device receives a second user interface including actual values for the treatment metrics, the actual values determined based on sensor data generated as the farming machine operates in the field. The client device receives updated user priority values for the treatment metrics, where the updated user priority values are received by the user interacting with the second user interface. The client device transmits the updated user priority values for the treatment metrics to the farming machine for the farming machine to implement while the farming machine treats plants in the field.

Other aspects include components, devices, systems, improvements, methods, processes, applications, computer readable mediums, and other technologies related to any of the above.

BRIEF DESCRIPTION OF DRAWINGS

FIG. 3 is a flowchart of an example method for operating a farming machine, in accordance with one or more embodiments.

FIGS. 4-5B are user interfaces that may be displayed to a user, in accordance with one or more example embodiments.

Figure 1A:
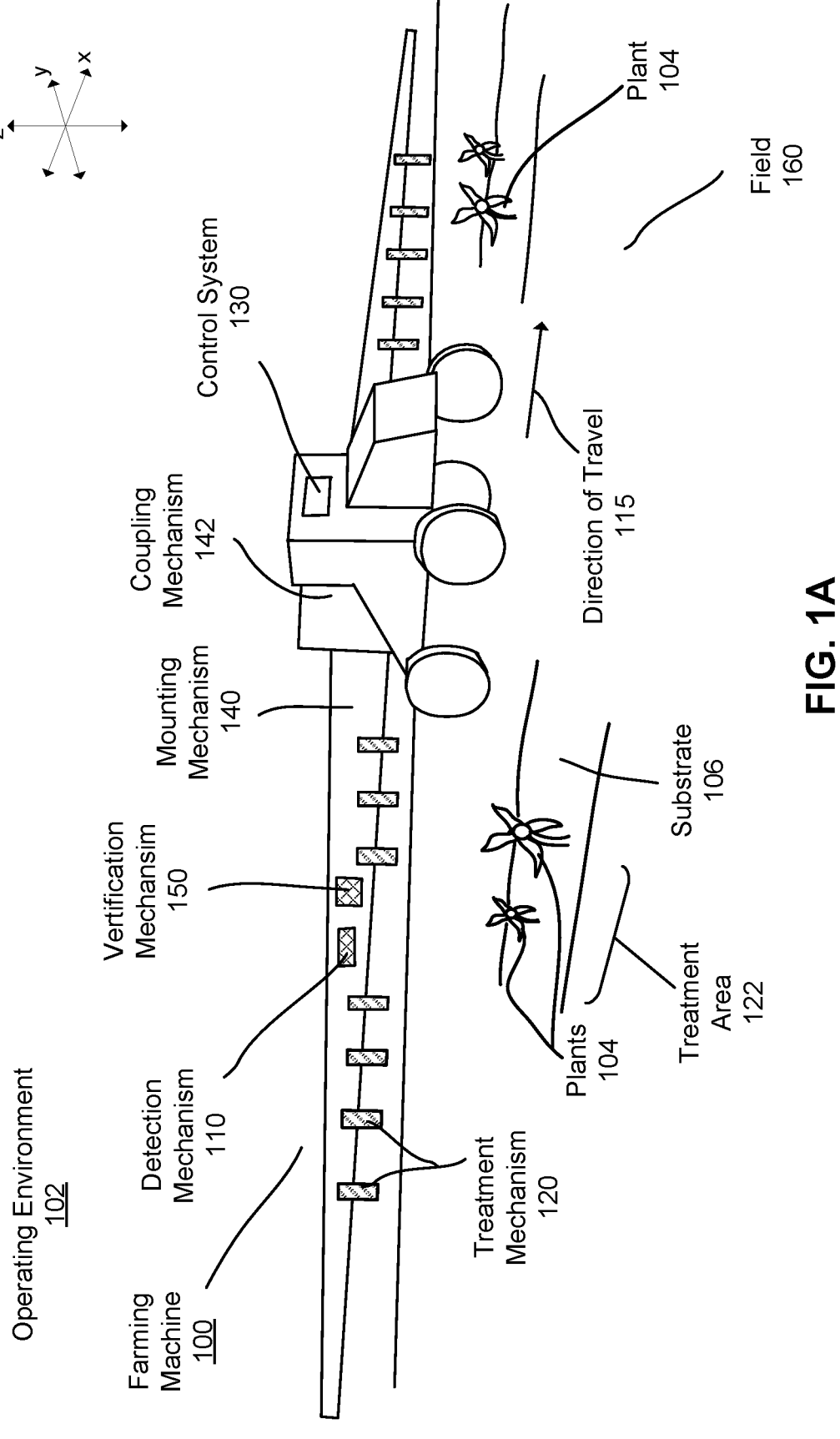
FIG. 1A illustrates an isometric view of a farming machine, in accordance with a first example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Embodiments relate to operating a farming machine according to user priority values. FIGS. 1-2 describe general information related to example farming machines.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
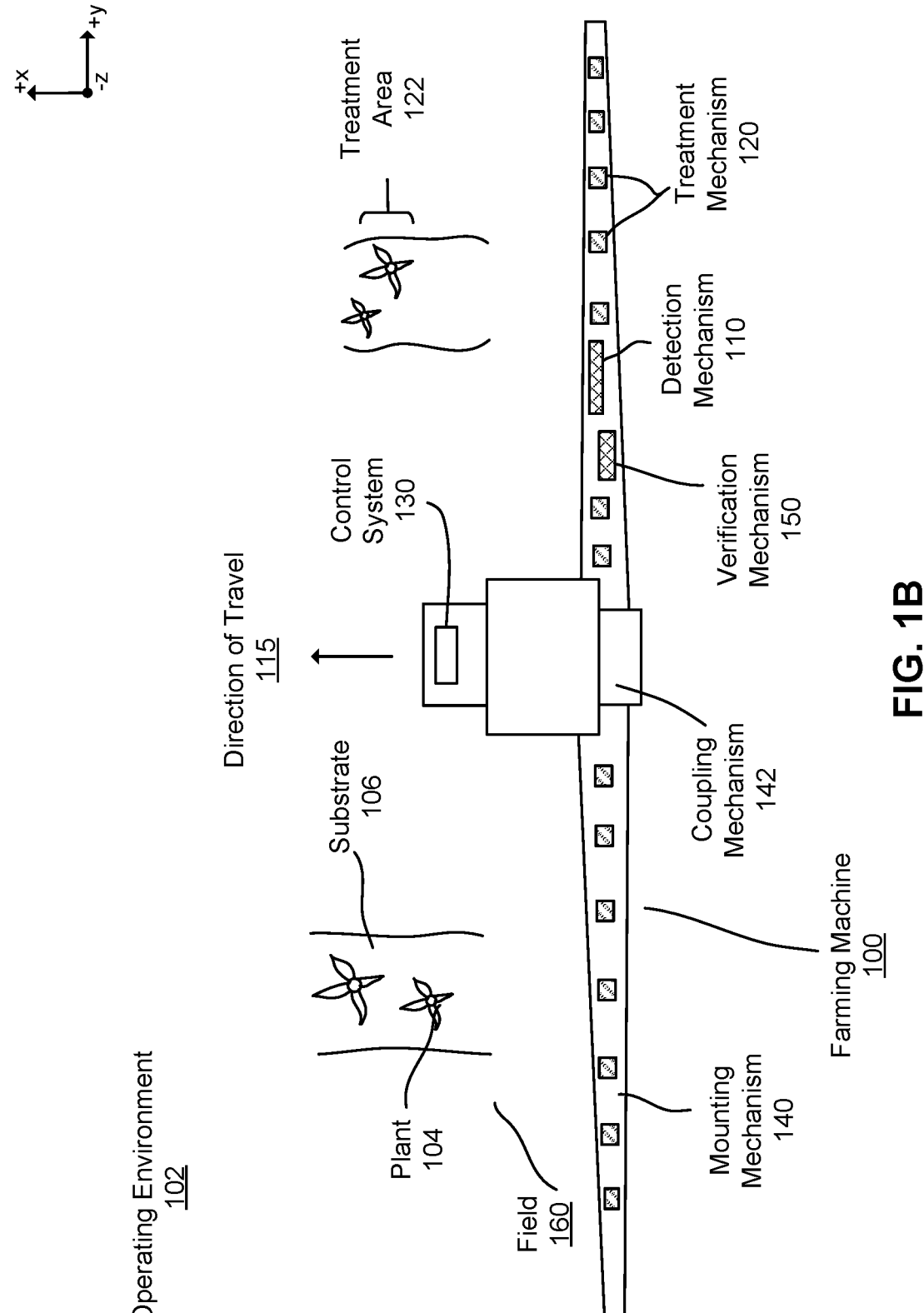
FIG. 1B illustrates a top view of a farming machine, in accordance with the first embodiment.
Figure 1C:
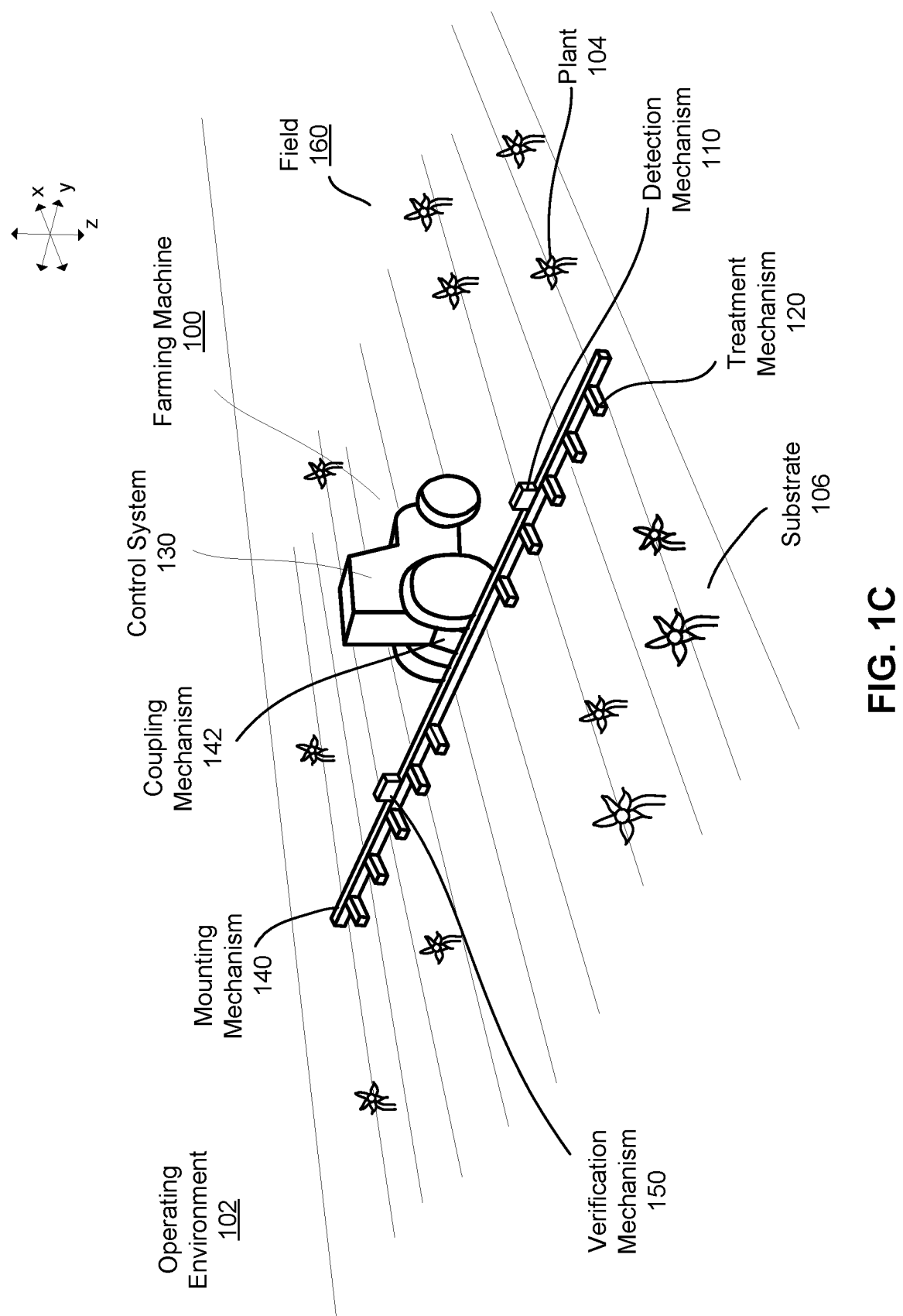
FIG. 1C illustrates an isometric view of a farming machine, in accordance with a second example embodiment.
Figure 2:
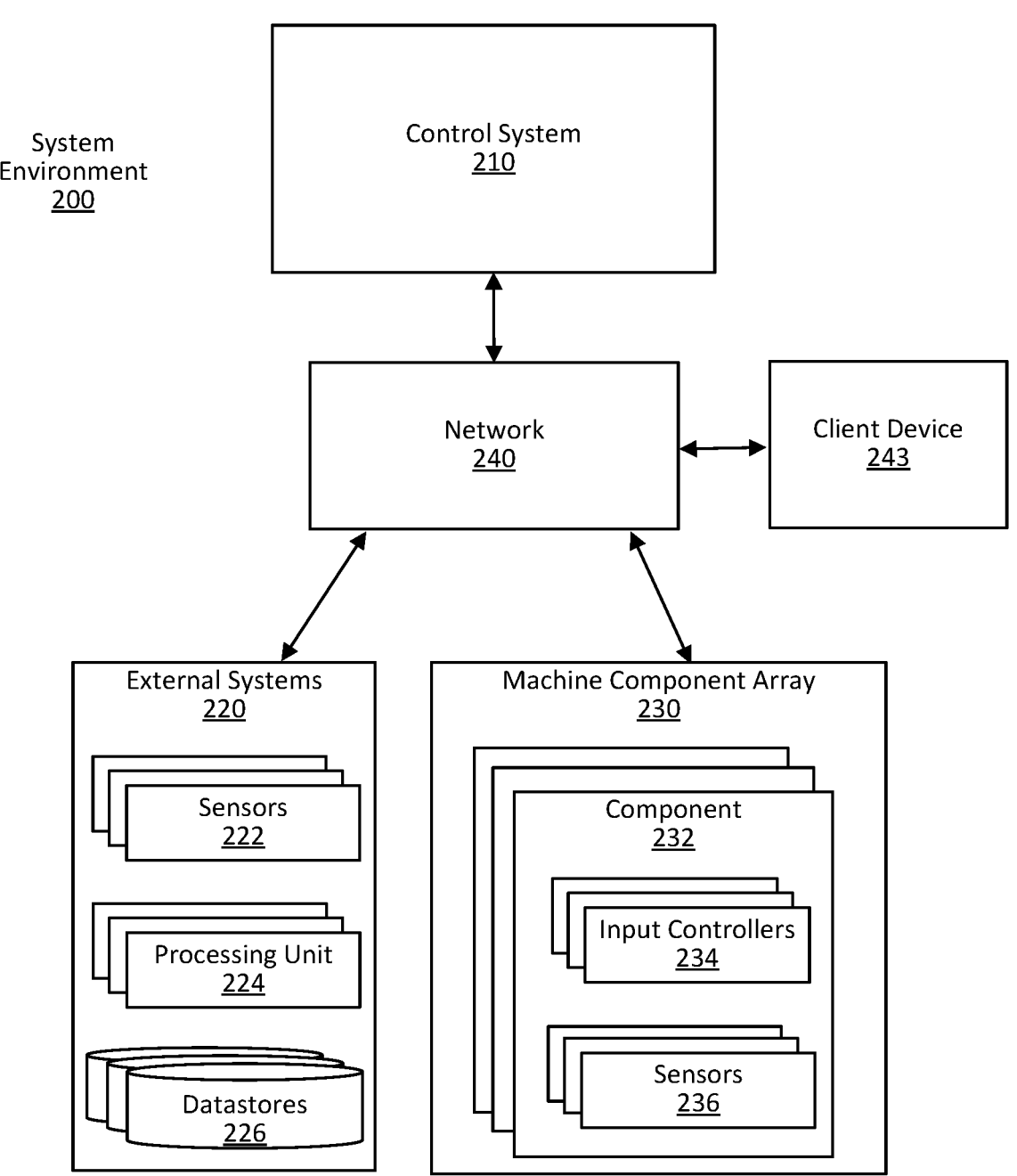
FIG. 2 is a block diagram of the system environment for the farming machine, in accordance with one or more example embodiments.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding)

or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment 102

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III. A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant treatment model that identifies plants 104 in the captured image. A plant treatment model may also determine farming actions to implement. The farming machine 100 then implements farming actions in the field 160 based on the output of the plant treatment model.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray a treatment product such as one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement (e.g., via a plant treatment model), and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is, translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant treatment model to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III. B System Environment

FIG. 2 is a block diagram of the system environment for the farming machine 100, in accordance with one or more example embodiments. In this example, the control system 210 (e.g., control system 130) is connected to external systems 220, a machine component array 230, and a client device 243 via a network 240 within the system environment 200.

The external systems 220 are any system that can generate data representing information useful for determining and implementing farming actions in a field. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in determining and implementing farming actions in the field. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in determining and implementing farming actions in the field. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 232 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 236 generates data representing measurements of the operating environment 102 and provides that data to other systems and components within the system environment 200. The measurements may be of a component 232, the farming machine 100, the operating environment 102, etc. For example, a sensor 236 may measure a configuration or state of the component 232 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 210 receives information from external systems 220 and the machine component array 230 and implements a treatment plan in a field with a farming machine.

The client device 243 is one or more computing devices capable of receiving user input as well as transmitting and/or receiving data via the network 240. In one embodiment, a client device 243 is a conventional computer system, such as a desktop or a laptop computer. Alternatively, a client device 243 may be a device having computer functionality, such as a personal digital assistant (PDA), a mobile telephone, a smartphone, or another suitable device. A client device 243 is configured to communicate via the network 240. In one embodiment, a client device 243 executes an application allowing a user of the client device 243 to interact with the control system 210. For example, a client device 243 executes a browser application to enable interaction between the client device 243 and the control system 210 via the network 240. In another embodiment, a client device 243 interacts with the control system 210 through an application programming interface (API) running on a native operating system of the client device 243, such as IOS® or ANDROID™.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the external systems 220 array and component array 230, processes the information, and transmits the information to the control system 230. The control system 210 generates a farming action based on the information and transmits instructions to implement the farming action to the appropriate component(s) 232 of the component array 230.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like. In some embodiments, the network 240 may comprise any combination of local area and/or wide area networks, using both wired and/or wireless communication systems. In one embodiment, the network 240 uses standard communications technologies and/or protocols.

IV. User Priorities for Performing Farming Actions

As previously mentioned, a user can have a variety of different priorities for performing farming actions in a field. Example factors that may affect a user's priorities include the current condition of the plants in the field (e.g., the season, type of crop in the field, types of weeds in the field, and the growth stages or sizes of the crop and weeds in the field); past, present, or predicted weather conditions; and economic considerations (e.g., available budget, available time to perform treatment actions, cost of treatment products (e.g., herbicide, pesticides, and fertilizer), or expected crop prices at different crop qualities). For example, in some situations a user may desire to treat each individual crop plant and each individual weed plant in a field (e.g., the user has a large budget, and the field includes weeds that will be harmful to the crop plants). However, in other situations, the user may not want to treat each individual plant in the field. For example, if the user has limited treatment product or has limited time, the user may wish to treat only a portion of plants in the field (e.g., 75% of the plants). Additionally, a user's preferences may change throughout a season (e.g., early, mid, and late season treatment passes following different goals or strategies). For example, a farmer with a large amount of treatment product during the early season may desire to treat a large portion of crop and weed plants in the field. However, in the late season, if the user only has a small amount of treatment product remaining, the user may desire to apply small amounts of treatment product to plants to avoid prematurely running out of the product.

To account for the different and changing priorities of users, some embodiments relate to quantifying these priorities and configuring a farming machine to operate based on these priorities. Additionally, based on actual field conditions, the user may update their priorities as the farming machine operates in the field. For simplicity, descriptions are in the context of a farming machine operating in a field, however the teachings herein may be applied to a farming machine operating in a portion of a field or multiple fields (e.g., all acres of a farm). For example, a user's priorities may affect operation of a farming machine in a portion of a field or multiple fields.

Some embodiments relate to a cycle which includes a planning phase, a control phase, and an adjustment phase, which is further described below.

During the planning phase of the cycle, the system (e.g., 210) determines user priority values for a user for one or more correlated plant treatment metrics for treatments to one or more plants. Example plant treatment metrics include plant treatment quality for one or more target plants, treatment quality for one or more non-target plants, treatment product savings for one or more treatment products, farming machine productivity, number of passes, or some combination thereof. The user may indicate their priority values on a user interface (e.g., displayed by client device 243).

After the user priority values are determined, the system may determine prediction information which may be useful to the user prior to the farming machine operating in the field, such as nozzle type recommendation, agronomy best practices, and a treatment product volume to prepare. The system may also provide recommendations while the farming machine operates in the field e.g., to help ensure the farming machine operates according to their priorities.

During the control phase, the system operates a farming machine (e.g., 100) according to the user priority values. For example, the system operates the farming machine with the goal of achieving a plant treatment quality value substantially equal to (e.g., within a threshold difference or within threshold percent e.g., 5% or 10%) the associated user priority value for plant treatment quality, a treatment product savings value substantially equal to the associated user priority value for treatment product savings, and a farming machine productivity value substantially equal to the associated user priority value for farming machine productivity. However, due to practical considerations, such as weather conditions and the soil conditions, the system may be unable to operate the farming machine so that the farming machine perfectly achieves the user priority values. For example, due to wet soil conditions, the system may reduce the speed of the farming machine e.g., to achieve the plant treatment quality value indicated by the user. In another example, dry conditions may result in excessive dust or windy conditions may affect a nozzle or spray type for treating plants in the field (which may affect one or more treatment metrics, such as product usage or treatment quality).

During the control phase, the user may monitor operation of the farming machine (e.g., via an interface on client device 243). For example, a user interface displays actual values (also "current values" or "real values") of the treatment metrics (e.g., determined based on sensor data from sensors of the farming machine). For plant treatment quality, the interface may display the plant hit rate. For treatment product savings, the interface may display the spray coverage relative to broadest possible coverage. For farming machine productivity, the interface may display the speed of the farming machine. For number of passes, the interface may display the likelihood that the farming machine will achieve the number of passes specified by the user.

Based on the monitoring, the user may provide updated user priority values (also "updated target values") for one or more of the plant treatment metrics (e.g., via client device 243). For example, if the actual value of the plant treatment quality is lower than the original user priority value, the user may provide an updated user priority value to adjust the plant treatment quality of the farming machine. To help the user determine whether to submit updated user priority values, the system may provide insights to the user. For example, the system provides an interface that communicates tradeoffs for modifying treatment metric values (e.g., the interface illustrates the effect a modification to a first metric may have on other treatment metrics). To provide a specific example, an interface may illustrate how changing the current value of the farming machine productivity (e.g., speed) will affect the current value of the plant treatment quality (e.g., to increase farming machine productivity, a nozzle and boom position or pose of the farming machine may be adjusted, thus affecting plant treatment quality).

Additionally, or alternatively, the system may provide a recommendation to the user (e.g., via an interface on client device 243). For example, if consumption of the treatment product is high (e.g., an extra tendering step may be required), the interface may display a recommendation to reduce the consumption (e.g., even if the product savings value is within a threshold range of the associated user priority). In another example, if consumption of the treatment product is low (e.g., the user may need to dump leftover product at the side of the field), the interface may display a recommendation to increase the consumption (e.g., even if the product savings value is within a threshold range of the associated user priority). Note that the following examples assume the user previously indicated (e.g., via a user value for the remaining treatment product metric) that they wanted little or no excess treatment product after the farming machine finished treating plants in the field The user may provide updated user priority values responsive to these recommendations.

During the adjustment phase, the system modifies the operation of the farming machine, according to any updated user priority values received from the user (e.g., via the client device 243).

IV. A Example Methods

FIG. 3 is a flowchart of an example method 300 for operating a farming machine configured to perform farming actions in a field according to user priorities, in accordance with one or more embodiments. The method 300 may be performed from the perspective of the control system 210. The method 300 can include greater or fewer steps than described herein. Additionally, the steps can be performed in different order, or by different components than described herein. Among other advantages, the method 300 provides a feedback loop that helps to achieve the user's priorities for the field, despite possibly changing field conditions, changing farming machine behavior, changing environmental conditions, changing economic conditions, etc.

At step 310, the control system 210 sends for display on a client device (e.g., 243) a first user interface requesting user priority values for one or more treatment metrics for one or more plants (e.g., one or more plant types).

Generally, treatment metrics describe how a farming machine operates in a field (e.g., performs farming actions in a field). Depending on context, user priority values (also "target values"), actual values, and updated priority values (also "updated target values") refer to values for treatment metrics. Furthermore, different farming actions may be associated with the same or a different values for a given treatment metric (e.g., a first farming action (e.g., actions treating a first plant type) is associated with a first plant treatment quality value and a second farming action (e.g., actions treating a second plant type) is associated with a second plant treatment quality value. Example treatment metrics are described below.

Plant treatment quality is an example treatment metric which describes the quality of farming actions (e.g., treatments) applied to or to be applied to plants in the field. For example, if plants of a plant type in the field should be treated (referred to as a "target" plants), the plant treatment quality may be the percentage of target plants that will be treated by the farming machine (this may be referred to as "treatment rate" or "hit rate"), the buffer size of a spray zone to treat the target plants, identification sensitivity (the sensitivity of a classification model to identify a plant), or some combination thereof (e.g., the plant treatment quality is a weighted sum of a combination of the examples described above). A user may assign a higher priority value to plant treatment quality if, for example, the farming machine will be treating a highly harmful weed in the field. Conversely, the user may assign a lower priority value to treatment quality if, for example, the farming machine will be treating a mildly harmful weed. As previously indicated, different farming actions may be associated with different plant treatment quality values (e.g., the user specifies a first plant treatment quality value for a treatment to be applied to a first plant type and specifies a second plant treatment quality value for a treatment to be applied to a second plant type.

As indicated in the previous paragraph, plant treatment quality may refer to the quality of a farming action applied to a target plant. Additionally, or alternatively, treatment quality may refer to a treatment (unintentionally) applied to a non-target plant. For example, while treating weeds with a non-selective herbicide, some crop plants may be unintentionally treated with the herbicide (which may damage the crop). Thus, in this example, a user can indicate their level of tolerance for allowable crop damage by providing a plant treatment quality value for the crop plants (which is the non-target plant in this example).

Another example treatment metric is treatment product savings, which relates to the quantity of treatment product used or to be used when the farming machine treats plants in the field. As used herein, treatment product refers to a substance that may be applied to (e.g., sprayed on) plants or soil of a field. Example treatment products include a herbicide, a fungicide, insecticide, defoliant, plant growth inhibitor, and water. The treatment product savings metric may indicate the quantity (also "amount") of pesticide to be used to treat weeds in a field (the quantity may be a range of values instead of a single value). A lower quantity of treatment product results in increased product savings, while a higher quantity of treatment product results in decreased product savings. A user may assign a high priority value to product savings if, for example, they are low on funds or low on a remaining amount of treatment product. A user may assign a lower priority value to treatment product savings if, for example, they have a large amount of treatment product they want applied to the plants in a field.

Another example treatment metric is farming machine productivity, which describes the rapidity of the farming machine moving through the field. Said differently, farming machine productivity indicates how quickly (e.g., the speed of) the farming machine moves through the field as it treats plants in the field. For example, farming machine productivity describes the acres treated per hour by the farming machine, the speed of the farming machine, the time to apply a treatment to a plant, or some combination thereof. Farming machine productivity may also describe time used for tendering and traveling to the tender nurse without spraying. A user may assign a high priority value to farming machine productivity if, for example, they have a large number of fields to treat in a day, there is little time left in the day to treat the plants in the field, the weather forecast indicates unfavorable weather incoming, or it is late in the season. A user may assign a lower priority value to farming machine productivity if, for example, they have only a few number of fields to treat, the weather forecast indicates clear weather, or it is early in the season.

Another example treatment metric is the number of desired passes (in other words, the number of times the farming machine moves through the entire field). For example, a user may typically perform two passes through a field, but if a field is a long distance from a farm, the user may want to limit the number of passes for that field to one.

Another example treatment metric is the amount of remaining treatment product after the farming machine finishes treating plants in a field. Some treatment products need to be disposed of if there is extra product. For example, some treatment products (a) have a limited efficacy time window that prevents them from being used later, (b) are difficult to offload from the farming machine or (c) must be dumped (e.g., by law or due to corrosiveness of the product) if there is extra product (e.g., remaining product after treating a field). However, other treatment products may be reused if there is extra product after treating plants in a field. Thus, the remaining treatment product allows the user to indicate whether leftover treatment product is acceptable or not after the farming machine finishes treating plants in a field.

Depending on the treatment metrics, each metric may be independent of the other metrics. However, treatment metrics are often dependent on each other. For example, if a user prefers a higher plant treatment quality value, this may result in a lower treatment product savings value or lower farming machine productivity value. More generally, if a user selects a user priority value for a first metric, the priority values available for selection for a correlated second treatment metric may be limited to a sub-range based on the priority value for the first metric.

Among other advantages, the control system 210 may include a metric correlation predictor model configured to predict the correlation between two or more metrics. The metric correlation predictor model may be a machine learned model. For example, the metric correlation predictor model is trained based on historical farming data for the field or fields similar to the field (e.g., similar historical weather patterns, location, soil type, plant type or some combination thereof). In some embodiments, the metric correlation predictor model can be updated using recent farming data (e.g., farming data generated from treating plants a few days previous or farming data generated from a neighboring farm or field). Among other advantages, this may increase the accuracy of the metric correlation predictor model. The metric correlation predictor model may receive inputs such as expected weather, a make and model of the farming machine, the implement of the farming machine, plants in the field, farming actions to be performed (e.g., specified in a treatment plan) or some combination thereof. The metric correlation predictor model may output correlations between treatment metrics. The determined correlations between treatment metrics may be used to configure the first user interface. For example, if a user selects a user priority value for a first metric, the priority values available for selection for a correlated second treatment metric may be based on a correlation determined by the metric correlation predictor model. Among other advantages, the metric correlation predictor model can provide correlations which may not be known, intuitive, or easily determined by a user, even an experienced user. Additional information for generating or modifying the metric correlation predictor model is provided below.

Buffer size (an example of treatment quality) may be used to increase or decrease confidence in treating target plants, but may have a direct impact on treatment product savings (e.g., a larger buffer size results in treating more target plants (higher treatment quality) but also results in larger treatment product usage (lower product savings)). From simulations and historical data, a model may be generated to characterize the relationship between buffer size and product savings. Plant identification sensitivity (another example of treatment quality) may be similarly used to increase or decrease the confidence in treating target plants, but may also have a direct impact on treatment product savings (e.g., higher identification sensitivity results in treating more target plants but also results in larger treatment product usage). The relationship between plant identification sensitivity and product savings may be different than the relationship between buffer size and product savings. Also, note that increased treatment quality for target plants may increase the likelihood of non-targeted plants also being treated (e.g., non-selective herbicides hitting and damaging crops). For example, a larger buffer size or higher identification sensitivity may increase the number of non-target plants also being treated. Said differently, treatment quality for non-target plants may decrease as plant treatment quality for target plants increases. This relationship between treatment quality for target plants and treatment quality for non-target plants may be modeled and used to predict outcomes for different values (e.g., different buffer size or identification sensitivity values).

While the treatment quality and treatment product savings may be antagonistic, product savings and farming machine productivity may be positively correlated. Increased savings (e.g. by reducing the need for tendering), may have the potential to increase overall productivity. This may be modeled more heuristically because there is less dependence on the distribution of treated plants, as there is for treatment quality.

Figure 4:
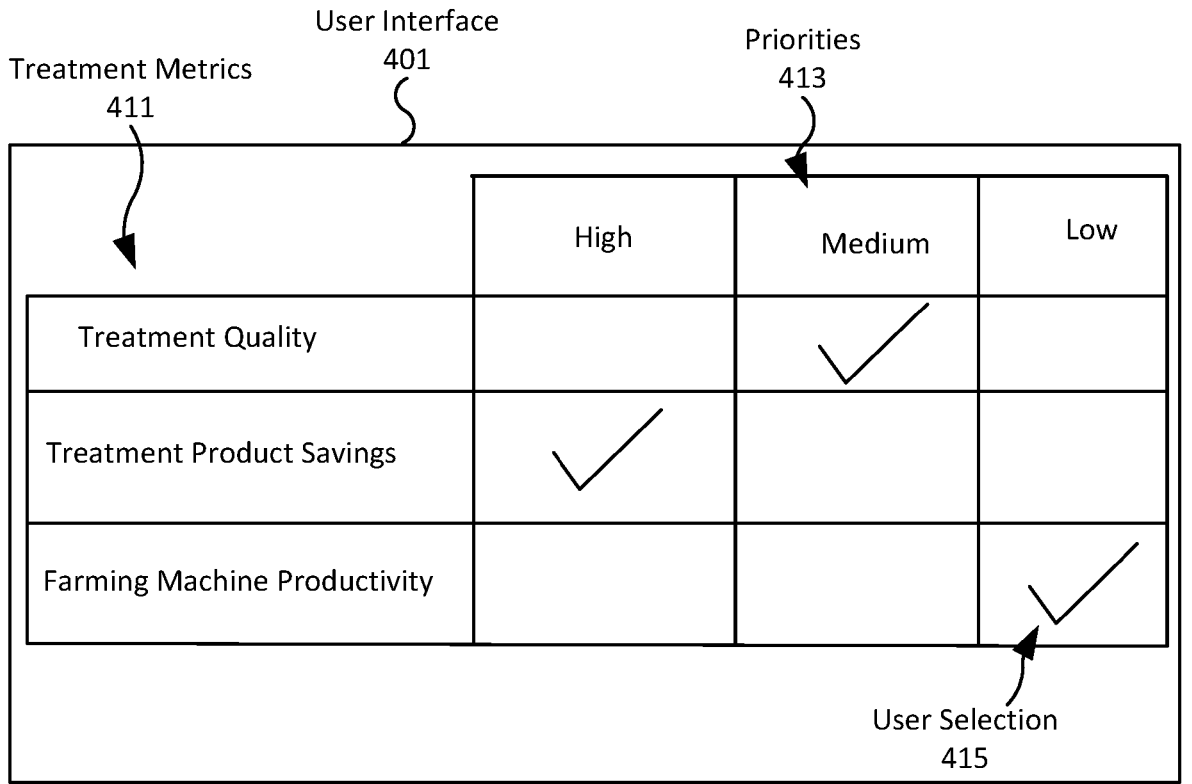

Example first user interfaces are described below with respect to FIGS. 4-5. FIG. 4 is a user interface 401 that may be displayed to a user (e.g., via client device 243), according to one or more embodiments. The interface 400 includes a matrix with treatment metrics 411 (left) and priority levels 413 (top). The interface 401 allows the user to assign priority values to each metric by interacting with boxes in the middle of the matrix (e.g., see user selection 415). In the example of FIG. 4, treatment product savings is the highest priority value, plant treatment quality is medium priority value, and farming machine productivity is the lowest priority value. These priority selections may be sent to the control system 210 (e.g., after the user has confirmed their selections). In this example, the high, medium, and low priorities 413 may correspond to specific values for each treatment metric. In another example, instead of "high," "medium," and "low" labels, the labels may be specific values. Although not illustrated in user interface 401, the user may provide additional information, such as the number of desired passes through the field. Among other advantages, user interface 401 allows a user to quickly and easily communicate their priority values for a field.

Figures 5A, 5B:
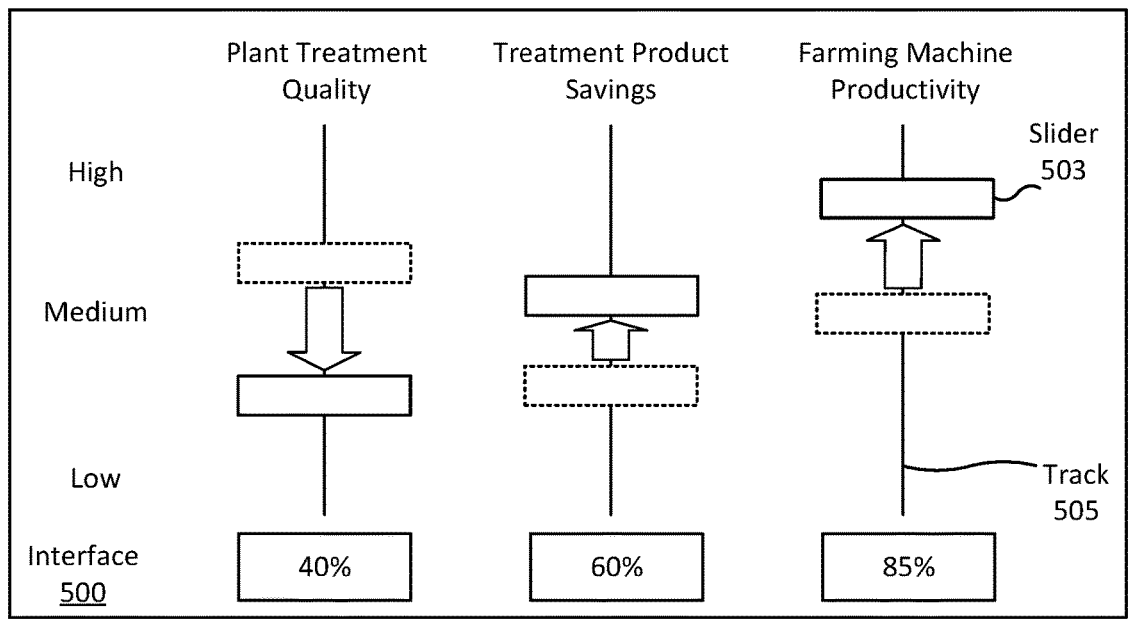

FIGS. 5A and 5B illustrate another user interface 500 that may be displayed to a user (e.g., via client device 243), according to one or more embodiments. FIG. 5B is similar to FIG. 5A except the sliders 503 are moved to different positions. Hereafter, FIG. 5 refers to FIGS. 5A and 5B collectively. The user interface 500 includes three treatment metrics 511 across the top (treatment quality, product savings, and productivity). For each metric, the user interface 500 includes a slider 503 and a track 505 for the slider. Each slider 503 can move along its track 505. The position of each slider 503 indicates the value for the associated metric. The value of each metric is displayed below its track 505. In the example of FIG. 5, the value of each metric is relative to another quantity. For example, the treatment quality slider position indicates the current hit rate relative to a perfect hit rate, the product savings slider position indicates the spray buffer size relative to a maximum buffer size, and the productivity indicates the current speed of the farming machine relative to the maximum speed of the farming machine. Although not illustrated in user interface 500, the user may provide additional information, such as the number of desired passes through the field.

Similar to interface 401, user interface 500 allows a user to assign priority values to each metric. Specifically, a user can assign target values for the metrics 511 by changing the slider positions. These selections may be sent to the control system 210 (e.g., after the user has confirmed their selections).

As previously described, treatment metrics are often correlated with each other. Thus, if one of the sliders changes positions (e.g., by the user interacting with the interface), the remaining two sliders may also change positions according to the correlation between those metrics (e.g., see position changes in FIG. 5B). To provide a general example, if the treatment quality increases by a first amount, the product savings may decrease by a second amount, and the productivity may decrease by a third amount, where the first, second, and third amounts may be different or the same from each other). Thus, among other advantages, user interface 500 allows a user to visualize the relationship between each of the metrics 511 by watching a slider change positions responsive to another slider changing position.

Although not illustrated in FIGS. 5A and 5B, an interface requesting user priority values may provide context information to assist the user to select their values. For example, the interface displays past user priority values (e.g., values selected for other fields or previous seasons, or priority values from other users organized by region, crop, date, etc.

Referring back to FIG. 3, at step 320, the control system 210 receives user priority values as input from a user interacting with a user interface of the client device. The control system 210 may receive a user priority value for each treatment metric.

At step 330, the control system 210 operates the farming machine according to the user priority values. More specifically, the control system 210 attempts to operate the farming machine such that the farming machine achieves actual values of the treatment metrics substantially equal to the user priority values for the treatment metrics (in this context, substantially equal may refer to actual metric values within a threshold range or threshold percent of the user priority values).

To operate the farming machine according to the user priority values, the control system 210 may determine parameters for operating the farming machine ("operational parameters") with the goal of achieving the priority values for the treatment metrics. Example parameters include the speed of the farming machine as it moves through a field, spray parameters, a plant hit rate, boom height, and buffer size. For example, if the farming machine productivity has a high user priority value while plant treatment quality has a low priority value, the system 210 may specify a high farming machine speed, a high boom height, and a low plant hit rate for the farming machine. Example operations of the control system 210 based on user priority values are further described below with respect to plant treatment quality, treatment product savings, and farming machine productivity:

Plant Treatment Quality:

The control system 210 may increase or decrease the identification sensitivity value for a (e.g., plant) classification model. Increasing this setting reduces the confidence threshold to classify pixels as a plant type (e.g., a weed), thereby reducing the rate of false negative classifications and increasing the rate of false positive classifications. The control system 210 may increase or decrease the detection size for the plants by the classification model. When pixels are classified as plants, clusters of pixels can be filtered out if the cluster is smaller than a threshold number of pixels. By reducing the threshold number, this may increase the rate of false positives and decrease the rate of false negatives classifications. The control system 210 may increase or decrease the buffer size. Increasing the buffer size may increase the likelihood that undetected plants are still treated due to their proximity to identified plants. This may be particularly helpful for treating grass weeds, but is true of other (e.g., all) weed types as well, which often bloom in clusters due to seed bank, and availability of water or soil nutrients.

Treatment Product Savings:

The control system 210 can increase or decrease buffer sizes. Lateral (perpendicular to the direction of travel) and longitudinal (in the direction of travel) buffers can be adjusted separately and with different impacts to savings. Depending on the prevalence and size of target plants (e.g., weeds) and their distribution in the field, or the height, angle and spacing of nozzles, these settings may have more sensitive or more linear control effects. The product application rate may be affected by modifying the speed of the farming machine, pressure/flow rate in the plumbing system and the application height of the nozzles. These effects may be used to counteract or magnify those effects on the buffers, or can be used to throttle other potential effects of using only buffers.

Farming Machine Productivity:

The control system 210 may increase or decrease the speed of the farming machine. Additionally, or alternatively, the control system 210 may adjust spray buffers to impact the frequency of tendering.

In some embodiments, the control system 210 generates a treatment plan (or modifies a previously generated treatment plan) for the field based on the user priority values and then operates the farming machine according to the treatment plan.

In some embodiments, to determine an operational parameter value, a function is defined for the operational parameter that depends on one or more treatment metric values. For example, the function includes a nominal value for the parameter added to treatment metric values and corresponding weights. Thus, in this example, the treatment metrics cause the operational parameter value to deviate from the nominal value according to the metric values and the weights. For example, if the buffer size has a nominal value of B, an example function may be: Buffer=B−a*(user priority value for treatment product savings)+b*(user priority value for plant treatment quality value)−c*(user priority value for farming machine productivity), where (a,b,c) are constants. In more complex forms, (a,b,c) may be functions that account for the dependency behaviors between the treatment metrics.

A more complex black-box approach determine an operational parameter value may be to use previous recorded machine data and simulations to create a machine learning model relating the various operational parameter value (e.g., buffer, speed, application height, sensitivity) to treatment metrics (e.g., product savings, treatment quality and productivity). Once that model is trained, values for the treatment metrics may be mapped to operational parameter values. The model may be updated in real time with measurements on the machine as it is driving through the field.

However, due to practical considerations, such as the current farming machine behavior, the current weather conditions, and the current soil conditions, the control system 210 may be unable to operate the farming machine so that the farming machine perfectly achieves the user priority values for each of the treatment metrics. For example, to achieve the user priority value for plant treatment quality the control system may reduce the speed of the farming machine due to wet soil conditions, which may result in a farming machine productivity value different from the associated user priority value. In another example, the boom height may be increased to avoid obstacles in the field, thus decreasing treatment quality from the user priority and/or affecting product savings.

At step 340, the control system 210 determines actual values of the treatment metrics as the farming machine operates in the field. As discussed above, due to practical considerations for operating the farming machine, the actual values of the treatment metrics are likely not the same as the priority values provided by the user. Thus, step 340 may help a user determine how the farming machine is operating relative to the priority values this provided.

The control system 210 determines the actual values of the treatment metrics based on sensor data (e.g., from sensors 222). For example, the control system 210 analyzes data from a verification mechanism (e.g., 150) to determine the actual value of the treatment quality (e.g., hit rate). In another example, the product savings value may be determined by monitoring the rate of treatment product consumed as the farming machine treats plants in the field.

In some embodiments, to generate the actual values of the treatment metrics with a predetermined accuracy threshold, the control system 210 waits until a threshold amount of sensor data is received (while the farming machine is operating in the field). For example, the threshold amount of sensor data may occur after the farming machine has operated for a threshold amount of time (e.g., fifteen minutes), has traversed a threshold distance (e.g., a hundred meters), has traversed a threshold portion of a field (e.g., at least ten percent), has treated a threshold number of plants (e.g., a hundred plants), or some combination thereof.

At step 350, the control system 210 sends for display on the client device a second user interface including the actual values for the treatment metrics.

For example, the actual value of the treatment quality (e.g., plant hit rate value) is displayed in real-time. The actual value of the treatment quality may be displayed relative to a maximum treatment quality value to help the user understand the value. In another example, the treatment product savings is displayed in a goal achievement bar (e.g., relative to a savings goal). Relatedly, the treatment product usage or usage rate may be displayed in a goal achievement bar relative to a target usage or rate (e.g., determined based on the user priorities previously provided). Among other advantages, the second user interface allows a user to monitor actual values for the treatment metrics as the farming machine operates in the field. In some embodiments, the second interface includes a warning indicator if an actual value for a metric conflicts with an annual goal (e.g., for product usage). The first interface may also include a warning indicator if a user priority for a metric conflicts with an annual goal.

An example second user interface is described with respect to FIG. 5 (the user interface 500 of FIG. 5 is not limited to just receiving user priorities (e.g., at step 310)). The user interface 500 of FIG. 5 may be displayed while the farming machine is operating. In these embodiments, the slider positions are based on real values of the metrics 511. As previously described, the real values of the metrics may be based on sensor data (e.g., from sensors of the farming machine). These values may be determined in real time. Thus, if a metric value changes, the slider position on the track 505 may be updated, and, assuming all three metrics are correlated with each other, slider positions of the other two metric may also be updated (see e.g., FIG. 5B which illustrates updated positions of the sliders). The correlation between the metrics may be determined based on the sensor data (e.g., the metric correlation predictor model or another model. Among other advantages, user interface 500 allows a user to visualize the relationship between each of the metrics 511 by watching a slider change positions responsive to another slider changing position.

Referring back to FIG. 3, at optional step 360, the control system 210 receives one or more updated user priority values from the client device for the treatment metrics. A user may provide updated user priority values after viewing user interface including the actual values for the treatment metrics (e.g., step 350) or due to changing priorities. For example, if it is late in the day, a user may desire to increase product usage to increase the likelihood of the treatment product being used up by the end of the day (many treatment products cannot be stored overnight).

The updated user priority values may be received as input from the user interacting with the second user interface of the client device. For example, referring to FIG. 5, the user interacts with any of the sliders 503 to indicate updated user priority values for the associated metrics.

Referring back to FIG. 3, at optional step 370, the control system 210 updates operation of the farming machine according to the one or more updated user priority values. Similar to step 330, operating the farming machine according to the updated user priority values refers to the control system 210 attempting to operate the farming machine such that the farming machine achieves actual values of the treatment metrics substantially equal to the updated user priority values for the treatment metrics (in this context, substantially equal may refer to actual metric values within a threshold range or error threshold of the updated user priority values).

In some embodiments, the control system 210 provides recommendations to a user (e.g., in the first or second user interfaces). The control system 210 may provide recommendations to a user of the farming machine prior to operation of the farming machine and based on the user priorities. For example, after receiving the user priority values, the control system 210 provides a recommendation to install a component type on the farming machine (e.g., spray nozzle type) to achieve the user priority values. In another example, based on the priority values for plant treatment quality, treatment product savings, and farming machine productivity, the control system 210 may recommend an amount of treatment product (e.g., pesticide) the farming machine should carry to achieve the user priorities. In another example, a library of peer-reviewed journal articles on treatments is maintained and an artificial intelligence module is configured to review the articles to help identify articles most relevant to the users priority values. To provide a treatment product recommendation, the control system 210 may include a treatment product recommendation model configured to predict an amount of treatment product needed to treat plants in an area (e.g., a portion of a field, a field, or multiple fields). The treatment product recommendation model may be trained based on historical treatment product usage data, past weather patterns, past plant (e.g., weed) pressure, yield data, or some combination thereof. The metric correlation predictor model may receive inputs such as expected weather, current plant pressure, and user priority values for one or more treatment metrics (e.g., at least treatment product savings). Among other advantages, the treatment product recommendation model may help reduce the amount of undesired treatment product usage and help the user achieve their desired product savings.

Additionally, or alternatively, the control system 210 may provide recommendations to a user of the farming machine while the farming machine is operating. For example, if the actual value of the treatment quality is below a maximum treatment quality value by a threshold amount, the second interface may include a recommendation to increase the treatment quality value. Conversely, if the actual value of the treatment quality is close to a maximum treatment quality value (e.g., less than a threshold amount), the second interface may include a recommendation to decrease the treatment quality value. In some embodiments, in addition to, or alternative to, providing a recommendation the control system 210 may automatically adjust the treatment quality actual value consistent with the recommendation. Among other advantages, the control system 210 assists in plants receiving quality treatments.

For example, as the farming machine treats plants in a field, the control system 210 may determine a predicted total treatment product usage for the field based on the size of the field remaining (to be treated) and based on sensor data (e.g., the product usage rate). If the predicted treatment product is larger than the amount of treatment product remaining with the farming machine by a threshold amount the second interface may include a recommendation to reduce the product consumption rate (e.g., reduce spray sensitivity). Conversely, if the predicted treatment product is smaller than the amount of treatment product remaining with the farming machine by a threshold amount, the second interface may include a recommendation to spray more aggressively (e.g., by increasing spray sensitivity). In some embodiments, instead of (or in addition to) providing the recommendation, the control system 210 may automatically adjust an operational parameter of the farming machine to modify the consumption rate (e.g., and then notify the user of the modification in an interface). Thus, the control system 210 helps reduce waste of treatment products (which may occur if the farming machine finishes treating a field without using all of the treatment product on board), while also helping increase the number of plants treated.

The method 300 of FIG. 3 is described from the perspective of the control system 210. However, a similar method may be described from the perspective of the client device 243. For example, the client device 243 receives a first user interface (e.g., 500) requesting user priority values for plant treatment metrics including treatment quality, treatment product savings, and farming machine productivity. The client device 243 receives, as input from a user interacting with the first user interface, user priority values for the treatment metrics. The client device 243 transmits the user priority values for the treatment metrics to the farming machine (e.g., to the control system 210) for the farming machine (e.g., the control system 210) to implement while the farming machine performs farming actions in the field. The client device 243 receives a second user interface (e.g., 500) including actual values for the treatment metrics, the actual values determined based on sensor data generated as the farming machine operates in the field. The client device 243 receives (e.g., from the control system 210) updated user priority values for the treatment metrics, where the updated user priority values are received by the user interacting with the second user interface. The client device 243 transmits the updated user priority values for the treatment metrics to the farming machine (e.g., the control system 210) for the farming machine to implement while the farming machine treats plants in the field.

V. Control System

Figure 6:
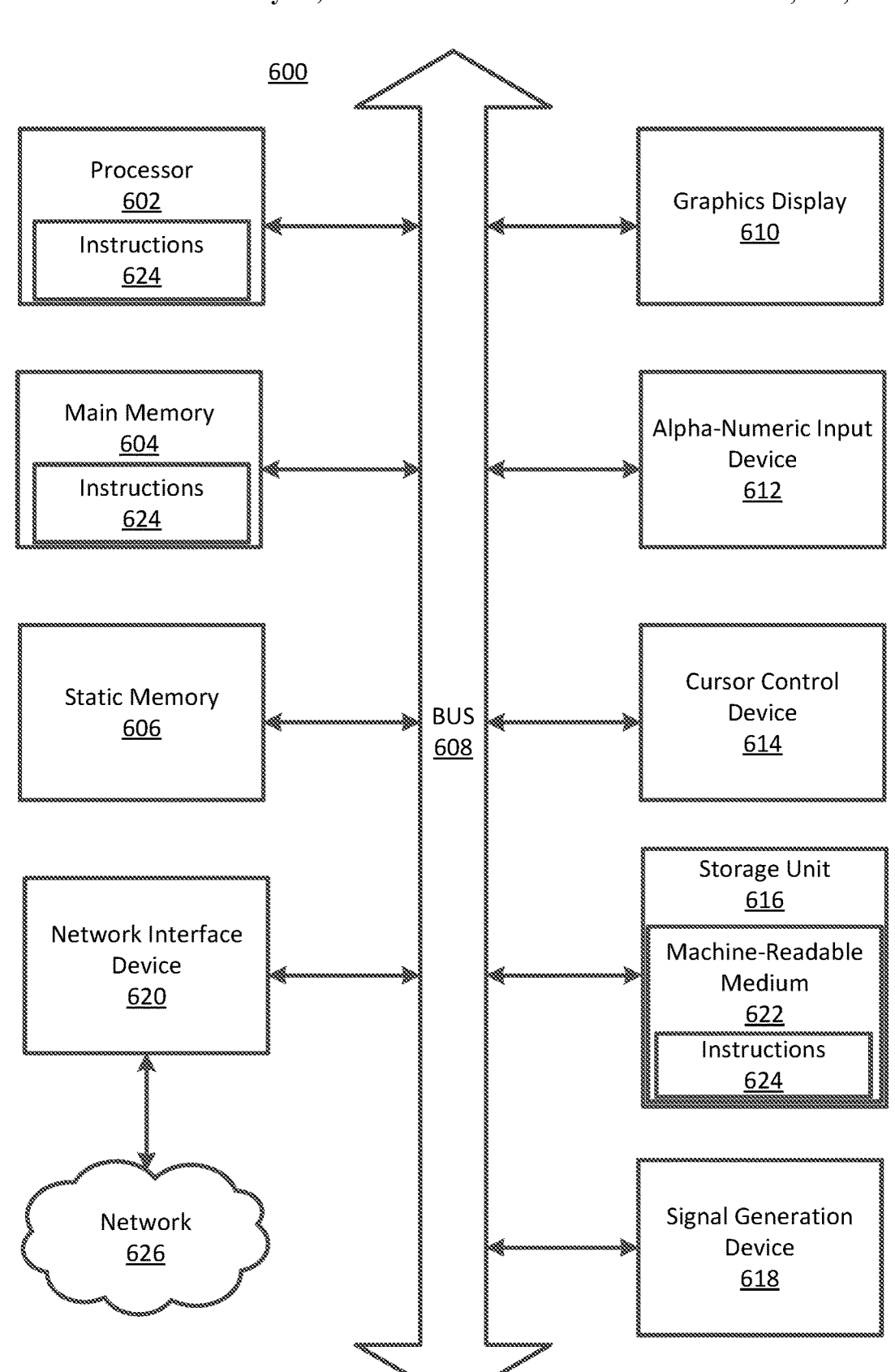
FIG. 6 is a block diagram illustrating components of an example machine for reading and executing instructions from a machine-readable medium, in accordance with one or more example embodiments.

FIG. 6 is a block diagram illustrating components of an example machine for reading and executing instructions from a machine-readable medium. Specifically, FIG. 6 shows a diagrammatic representation of control system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, one or more central processing units (CPUs), one or more graphics processing units (GPUs), one or more digital signal processors (DSPs), one or more controllers, one or more state machines, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 130 described in FIG. 2. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 240) via the network interface device 620.

VI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Furthermore, it has also proven convenient at times, to refer to arrangements of operations as modules, without loss of generality. The described operations and their associated modules may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer (e.g., physically mounted within a machine 100). This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for operating a farming machine configured to perform farming actions in a field, the method comprising:

sending for display on a client device a first user interface requesting user priority values for treatment metrics including treatment quality, treatment product savings, and farming machine productivity, the user priority values to be implemented while the farming machine performs farming actions in the field;

receiving, as first input from a user interacting with the first user interface of the client device, user priority values;

operating the farming machine according to the user priority values;

based on sensor data generated as the farming machine operates in the field, determining actual values of the treatment metrics;

while the farming machine is operating according to the user priority values, sending for display on the client device a second user interface including the actual values for the treatment metrics, wherein the second user interface includes the actual values for the treatment quality, the treatment product savings, and the farming machine productivity;

receiving updated user priority values from the client device for the treatment metrics, the updated user priority values received as second input from the user interacting with the second user interface, wherein the updated user priority values are updated relative to the user priority values previously received as first input from the user interacting with the first user interface of the client device; and updating operation of the farming machine according to the updated user priority values.

2. The method of claim 1, wherein the treatment quality indicates a plant hit rate.

3. The method of claim 1, wherein the treatment product savings indicates an amount of plant treatment product used to treat plants.

4. The method of claim 1, wherein the farming machine productivity indicates a speed of the farming machine moving through the field.

5. The method of claim 1, wherein responsive to the actual value of the treatment quality being below a threshold value, the second user interface includes a recommendation to increase the actual value of the treatment quality.

6. The method of claim 1, further comprising:

determine a predicted treatment product usage for the field, wherein responsive to the predicted treatment product usage being larger than an amount of treatment product with the farming machine by a threshold amount, the second user interface includes a recommendation to change an actual value of a treatment metric to decrease a consumption rate of the treatment product.

7. The method of claim 1, further comprising:

determine a predicted treatment product usage for the field, wherein responsive to the predicted treatment product usage being smaller than an amount of treatment product with the farming machine by a threshold amount, the second user interface includes a recommendation to change an actual value of a treatment metric to increase a consumption rate of the treatment product.

8. The method of claim 1, wherein the second user interface indicates how changing an actual value of a first treatment metric affects an actual value of a second treatment metric different than the first treatment metric.

9. A non-transitory computer readable storage medium comprising stored instructions, the stored instructions, when executed by a computing device, cause the computing device to perform operations comprising:

sending for display on a client device a first user interface requesting user priority values for treatment metrics including treatment quality, treatment product savings, and farming machine productivity, the user priority values to be implemented while a farming machine performs farming actions in a field;

receiving, as input from a user interacting with a user interface of the client device, user priority values;

operating the farming machine according to the user priority values;

based on sensor data generated as the farming machine operates in the field, determining actual values of the treatment metrics;

while the farming machine is operating according to the user priority values, sending for display on the client device a second user interface including the actual values for the treatment metrics, wherein the second user interface includes the actual values for the treatment quality, the treatment product savings, and the farming machine productivity;

receiving updated user priority values from the client device for the treatment metrics, the updated user priority values received as second input from the user interacting with the second user interface, wherein the updated user priority values are updated relative to the user priority values previously received as first input from the user interacting with the first user interface of the client device; and updating operation of the farming machine according to the updated user priority values.

10. The non-transitory computer readable storage medium of claim 9, wherein the treatment quality indicates a plant hit rate.

11. The non-transitory computer readable storage medium of claim 9, wherein the treatment product savings indicates an amount of plant treatment product used to treat plants.

12. The non-transitory computer readable storage medium of claim 9, wherein the farming machine productivity indicates a speed of the farming machine moving through the field.

13. The non-transitory computer readable storage medium of claim 9, wherein each user priority value is relative to other user priority values.

14. The non-transitory computer readable storage medium of claim 9, wherein responsive to the actual value of the treatment quality being below a threshold value, the second user interface includes a recommendation to increase the actual value of the treatment quality.

15. The non-transitory computer readable storage medium of claim 9, wherein the operations of the computing device further comprise:

determine a predicted treatment product usage for the field, wherein responsive to the predicted treatment product usage being larger than an amount of treatment product with the farming machine by a threshold amount, the second user interface includes a recommendation to change an actual value of a treatment metric to decrease a consumption rate of the treatment product.

16. The non-transitory computer readable storage medium of claim 9, wherein the operations of the computing device further comprise:

determine a predicted treatment product usage for the field, wherein responsive to the predicted treatment product usage being smaller than an amount of treatment product with the farming machine by a threshold amount, the second user interface includes a recommendation to change an actual value of a treatment metric to increase a consumption rate of the treatment product.

17. The non-transitory computer readable storage medium of claim 9, wherein the second user interface indicates how changing an actual value of a first treatment metric affects an actual value of a second treatment metric different than the first treatment metric.

18. A farming machine configured to configured to perform farming actions in a field and configured to:

send for display on a client device a first user interface requesting user priority values for treatment metrics including treatment quality, treatment product savings, and farming machine productivity, the user priority values to be implemented while the farming machine performs farming actions in the field;

receive, as first input from a user interacting with the first user interface of the client device, user priority values;

operate the farming machine according to the user priority values;

based on sensor data generated as the farming machine operates in the field, determine actual values of the treatment metrics;

while the farming machine is operating according to the user priority values, send for display on the client device a second user interface including the actual values for the treatment metrics, wherein the second user interface includes the actual values for the treatment quality, the treatment product savings, and the farming machine productivity;

receive updated user priority values from the client device for the treatment metrics, the updated user priority values received as second input from the user interacting with the second user interface, wherein the updated user priority values are updated relative to the user priority values previously received as first input from the user interacting with the first user interface of the client device; and update operation of the farming machine according to the updated user priority values.

* * * * *